(12) United States Patent  
Anderson et al.

(10) Patent No.: US 8,458,455 B2  
(45) Date of Patent: Jun. 4, 2013

(54) TECHNIQUES FOR HANDLING SSL CERTIFICATE EXPIRATION AND RENEWAL

(75) Inventors: Gary D. Anderson, Austin, TX (US);  
Ajay K. Mahajan, Austin, TX (US);  
Hemlata N. Reddy, Austin, TX (US);  
Frank Scholz, Grafenau (DE)

(73) Assignee: International Business Machines Corporation, Armonk, NY (US)

( * ) Notice: Subject to any disclaimer, the term of this patent is extended or adjusted under 35 U.S.C. 154(b) by 1625 days.

(21) Appl. No.: 11/539,921

(22) Filed: Oct. 10, 2006

(65) Prior Publication Data

US 2008/0086633 A1   Apr. 10, 2008

(51) Int. Cl.  
*H04L 29/06* (2006.01)

(52) U.S. Cl.  
USPC ............ 713/156; 726/2; 726/5; 726/6; 726/7; 726/10

(58) Field of Classification Search  
USPC .......................................................... 713/156  
See application file for complete search history.

(56) References Cited

U.S. PATENT DOCUMENTS

| | | | |
|---|---|---|---|
| 6,189,097 B1 * | 2/2001 | Tycksen et al. ............... | 713/156 |
| 6,438,690 B1 | 8/2002 | Patel et al. | |
| 6,615,350 B1 * | 9/2003 | Schell et al. .................. | 713/168 |
| 6,675,296 B1 * | 1/2004 | Boeyen et al. ................ | 713/156 |
| 6,922,776 B2 * | 7/2005 | Cook et al. .................... | 713/156 |
| 2003/0035548 A1 * | 2/2003 | Kwan ........................... | 380/286 |
| 2004/0260652 A1 | 12/2004 | Rose | |
| 2005/0065799 A1 * | 3/2005 | Dare et al. ......................... | 705/1 |
| 2005/0071630 A1 * | 3/2005 | Thornton et al. ............. | 713/156 |
| 2005/0102503 A1 * | 5/2005 | Imai .............................. | 713/156 |
| 2005/0160476 A1 * | 7/2005 | Kakii ................................ | 726/5 |
| 2006/0015716 A1 * | 1/2006 | Thornton et al. ............. | 713/155 |
| 2006/0047965 A1 * | 3/2006 | Thayer .......................... | 713/176 |
| 2006/0206707 A1 * | 9/2006 | Kostal et al. .................. | 713/156 |

OTHER PUBLICATIONS

Al-Salihy et al., A New Proposed Protocol of Router's CA Certificate, Jun. 2006, ICOCI 2006 International Conference on Computing and Informatics, pp. 1-6.*

* cited by examiner

*Primary Examiner* — Taghi Arani  
*Assistant Examiner* — Kenneth Chang  
(74) *Attorney, Agent, or Firm* — Yudell Isidore Ng Russell PLLC

(57) ABSTRACT

A method for replacing a current security certificate includes producing a security certificate request at a first device that includes a request for a replacement security certificate. The method additionally includes sending the security certificate request to a security certificate vendor and receiving a replacement security certificate from the security certificate vendor. The method further includes installing the replacement security certificate within a verification layer of the client device and transmitting the replacement security certificate to the server. The method additionally includes verifying that the server has installed the replacement security certificate, wherein the verification further verifies that the replacement security certificate enables encrypted communication between the client device and the server. The method additionally includes archiving the current security certificate upon completion of the verification, and activating the replacement security certificate for use in encrypting communications between the client device and the server.

16 Claims, 5 Drawing Sheets

Application Execution Environment

TECHNIQUES FOR HANDLING SSL CERTIFICATE EXPIRATION AND RENEWAL

BACKGROUND OF THE INVENTION

1. Technical Field

The present invention generally relates to network security and in particular to Secure Socket Layer (SSL) encryption. Still more particularly, the present invention relates to upgrading/converting SSL certificates within a multi-format SSL network environment.

2. Description of the Related Art

Computing devices today are capable of performing many tasks. Conventional computing devices can execute various types of software products, and include the capability of forming a network when two or more computing devices are linked to send data and receive data. Computing devices are managed by and execute the software products using an operating system (O/S) that is running on the computing device. The O/S manages the hardware and software resources of the system and provides a stable, consistent way for applications to interact with the computing device hardware.

Security of data sent to computing devices within a network has become more and more important as many networks are connected to the Internet to allow users to access information via the Internet. Current security technologies in common deployment are insufficient for securing transactions within a network that is connected to the Internet and therefore the network and its component devices are at risk. Most existing browser-based security mechanisms, generally adequate for low-value business-to-consumer transactions, do not provide the enhanced security or flexibility required for protecting high-value commercial transactions and the sensitive data exchanges that comprise the transactions.

Therefore, digital signature schemes such as those that rely on public key cryptography have become a conventional method for verifying data transmissions. In public key cryptography, each user has a pair of keys: one public and one private. The public key is distributed freely, but the private key is kept secret and confidential. Another requirement is that it should be infeasible to derive the private key from the public key. Supporting information included with the public key is referred to as the certificate.

Typically, when a server system is purchased the server system includes a proprietary self-signed certificate that includes an expiration date and is not certified by a trusted third party (TTP). Unfortunately, within a network connected to the Internet, the clients of the server may not utilize the same proprietary SSL encryption library that the server uses. For example, the server may operate using a proprietary SSL encryption library while a client operates using an OpenSSL encryption scheme. Furthermore, for a client to upgrade its certificate, the server must upgrade its certificate simultaneously or the client and the server will lose the ability to communicate as a secure channel cannot be established without matching certificates. Also, if the upgrade is compromised, such as during or after installation, communication is lost between the client and the server.

Therefore, an adequate system for upgrading/converting client and server certificates simultaneously within a network environment has eluded those skilled in the art, until now.

SUMMARY OF THE INVENTION

Disclosed is a method for upgrading/converting client and server security certificates. Briefly stated, the method utilizes a security certificate modification layer as part of the client to implement the upgrading/converting of the client and server certificates. Once the upgrading/converting of the client and server certificates is successful and has been verified, the new certificates are activated and the old certificates are archived. If, after replacement of the security certificate, communication cannot be established, the method provides for rolling back to the old/archived security certificate.

In one aspect, a method for replacing a current security certificate is provided. The method includes producing a security certificate request at a first device that includes a request for a replacement security certificate wherein the security certificate enables encrypted communication between the first device and a second device. The method additionally includes sending the security certificate request to a security certificate vendor and the second device, and receiving a replacement security certificate from the security certificate vendor. The method further includes installing the received replacement security certificate within a verification layer of the first device and transmitting the replacement security certificate to the second device. The method additionally includes verifying that the second device has installed the new security certificate. The verification process further verifies that the replacement certificate enables encrypted communication between the first device and the second device. The method further includes archiving the current security certificate upon completion of the verification and activating the new security certificate for use in encrypting communications between the first device and the second device.

In another aspect, a computer program product is provided. The computer program product includes a computer readable medium and program code on said computer readable medium for: producing a certificate request at a first device based on received certificate request data, the certificate request produced to replace a current certificate; sending the certificate request to a server; receiving a certificate response at the first device, the certificate response sent from the server; sending the certificate request to a certificate vendor; receiving a new certificate from the certificate vendor; providing the received new certificate to the server; validating the new certificate at the first device and the server, the validation archiving the current security certificate upon completion; and implementing the new certificate at the first device and the server after the validation is successfully completed.

In yet another aspect, a system is provided. The system includes a client having means for receiving encrypted data and means for decrypting the received encrypted data using a current security certificate. The system further includes the client having means for requesting a new security certificate and means for receiving a new security certificate. The system additionally includes the client having means for installing the received new security certificate, verifying the installed new security certificate is operating on the client, and replacing the current security certificate with the new security certificate.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system and computer program product for replacing client and server security certificates within a network environment. In one embodiment, a client device initiates the replacement of the security certificate that enables encrypted communications between the client and a server within the network in which the client is operating. In another embodiment, a client initiates the replacement of the security certificate providing encrypted communications between the client and a server with which the client is communicating. In both embodiments, the client initiates the replacement of the security certificate, requests a new security certificate from a security certificate provider, sends the received replacement security certificate to the server, and verifies that the replacement certificate will enable encrypted communication between the client and the server. When the client has completed the verification, the replacement security certificate is then used for future encrypted communications between the client device/server and the server/server. Additionally, if at any time the client determines that the replacement of the security certificate has failed, the replacement security certificate is rolled back and replaced with a previously successful security certificate.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is also understood that the use of specific parameter names are for example only and not meant to imply any limitations on the invention. The invention may thus be implemented with different nomenclature/terminology utilized to describe the above parameters, without limitation.

Figure 1:
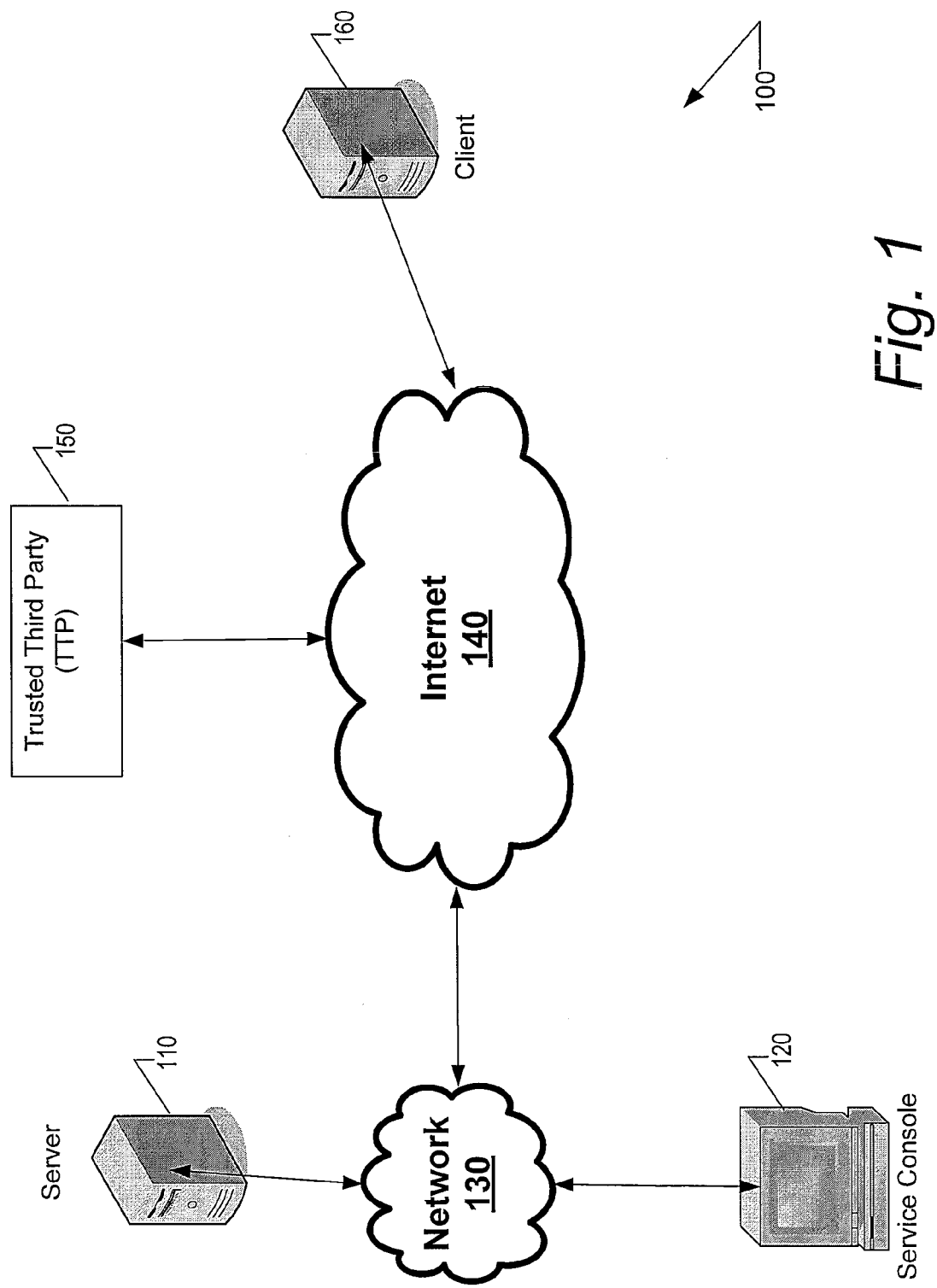
FIG. 1 is a functional block diagram generally illustrating a network environment in which implementations of the invention are applicable.

With reference now to the figures, FIG. 1 depicts a functional block diagram generally illustrating a network environment 100 in which implementations of the invention are particularly applicable. Network environment 100 includes server 110 that is in communication with service console 120 via network 130. Network 130 may be implemented as any client/server network, such as, a peer-to-peer network, a local area network (LAN), a wide-area network (WAN), and the like. Furthermore, the network may be constructed from any of the variously available equipment, such as, an Ethernet-based system utilizing IEEE 802.3 standard equipment and may communicate utilizing a standardized protocol, such as, TCP/IP. Both server 110 and service console 120 are computer systems, perhaps similar to system 300 of FIG. 3 (described below) and communicate using TCP/IP. In one embodiment, service console 120 is implemented as a hardware management console, such as available from IBM, Inc. of Armonk, N.Y.

Network environment 100 also includes Internet 140 to which network 130 as well as server 110 and service console 120 are connected. Internet 140 is a portal to a worldwide network with more than 100 million users that are linked for the exchange of data, news, conversation, and commerce. Unfortunately, connecting to Internet 140 introduces many potential security issues to network 130 and therefore to server 110 and service console 120 as well.

Network environment 100 additionally includes Trusted Third Party (TTP) 150 that is in communication with Internet 140 as well as the components of network environment 100 previously described. TTP 150 is a trusted security certificate vendor/service provider that provides security certificates. Examples of TTP security certificate vendors include Verisign, Inc. of Mountain View, Calif. and Thawte of Cape Town, South Africa.

Network environment 100 also includes client 160. Client 160 is a computer system, perhaps similar to system 300 of FIG. 3, below. Additionally, client 160 is also in communication with Internet 140 as well as the components of network environment 100 previously described.

In operation, service console 120 communicates with server 110 using a Secure Socket Layer (SSL) transaction. In an example, an SSL transaction starts with service console 120 sending a handshake to server 110. In response, server 110 sends a certificate associated with server 110. A certificate is a piece of data that includes a public key associated with the server as well as other information, such as the identity of the owner of the certificate, the certificate's expiration date, the fully qualified domain name associated with the server, and the like. During the connection process, server 110 proves its identity by using its private key to successfully decrypt a challenge that service console 120 encrypts with the server's public key. Service console 120 needs to receive the correct unencrypted data to proceed. This results in the server's certificate remaining public. To defeat this encryption system an attacker would need a copy of the certificate as well as the associated private key in order to masquerade as a downed server. Alternatively, client 160 may communicate with server 110 via Internet 140 using a Secure Socket Layer (SSL) transaction as described above.

A user may prefer to use an SSL transaction that provides additional security. Such a transaction is available from Trusted Third Party (TTP) 150. TTP 150, also called a Certification Authority, is responsible for keeping a database of valid certificates. TTP 150 signs valid server certificates using its private key. The signature indicates that the Certification Authority has conducted a background check on the entity that owns the certificate being presented, thus ensuring to some degree that the data presented in the certificate is accurate. That signature is included in the certificate and is presented at connection time. Service console 120 can validate the authority's signature, assuming that service console 120 has the public key of the TTP 150 locally stored/maintained. If the check succeeds, service console 120 can be reasonably confident the certificate is owned by an entity known to TTP 150, and service console 120 can then check the validity of other information stored in the certificate, such as whether the certificate has expired.

In another embodiment, the client (e.g., service console 120, client 160, and the like) initiates the replacement of the security certificate by requesting a new security certificate from TTP 150, sending the received replacement security certificate to server 110, and verifying that the replacement certificate will enable encrypted communication between client 160 and the server 110. When the client has completed the verification, the replacement security certificate is then used for future encrypted communications between the client and the server. Additionally, if at any time the client determines that the replacement of the security certificate has failed, the replacement security certificate can be rolled back and replaced with a previously utilized security certificate.

Figure 2:
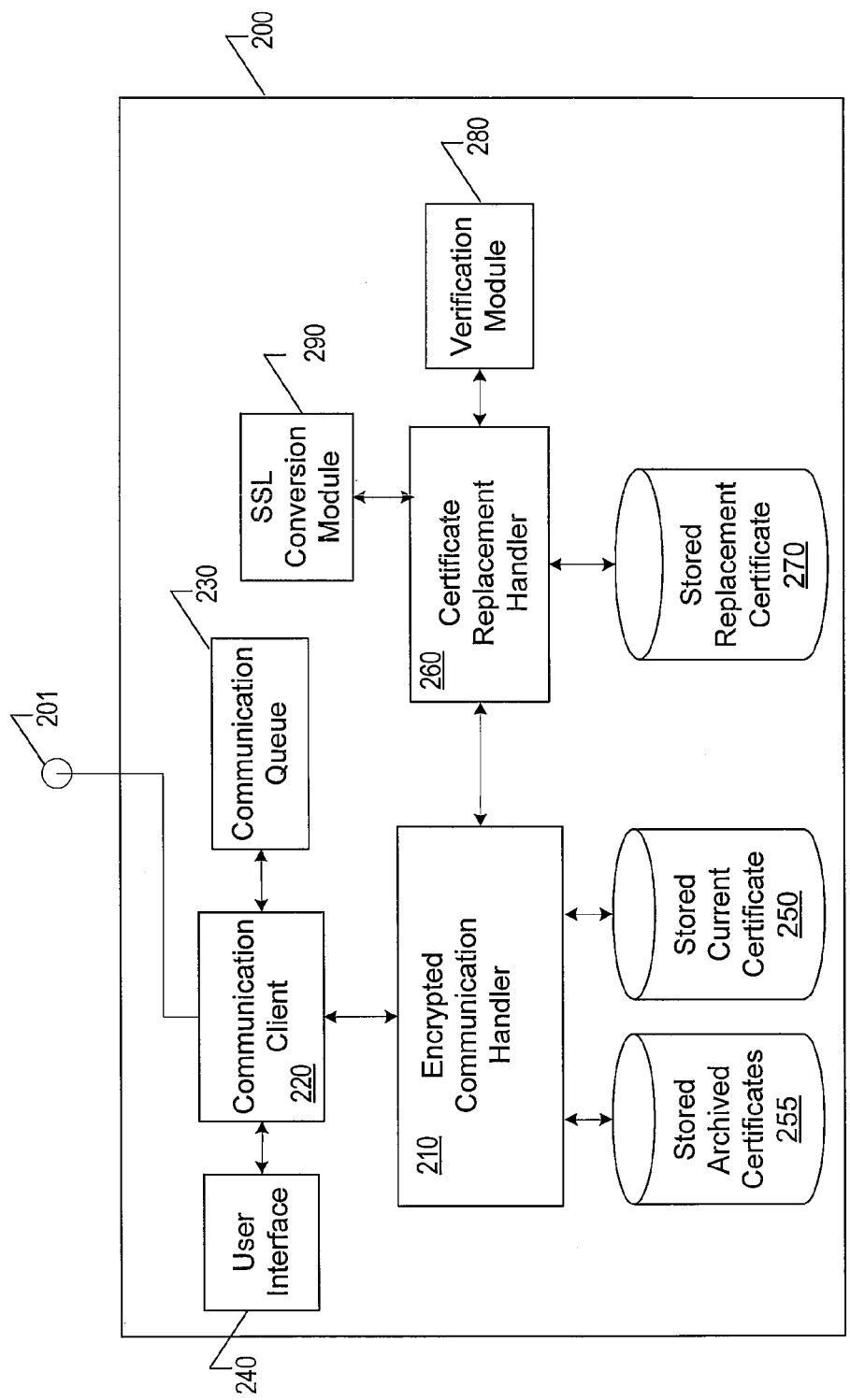
FIG. 2 is a functional block diagram generally illustrating an application execution environment in which implementations of the invention are applicable.

FIG. 2 is a functional block diagram generally illustrating an application execution environment 200 in which implementations of the invention are particularly applicable. Application execution environment 200 may be a system for executing software on a computing device, or the like. In this embodiment, application execution environment 200 includes components to facilitate replacing a security certificate within a network environment.

Communication client 220 provides general control functions for receiving communications over a communication transport, such as the TCP/IP communication protocol in common use today. In one embodiment, communication client 220 receives the communications from communications component 201, and stores any received communications in communication queue 230 for processing.

Encrypted communication handler 210 is a component for evaluating received communications for content and, when appropriate, to authenticate a message sender and decrypt the received messages and pass the decrypted messages to their destinations. Encrypted communication handler 210 is in communication with communication client 220 as well as stored current certificate database 250, stored archived certificate database 255, and certificate replacement handler 260 (discussed below). In one embodiment, encrypted communication handler 210 is notified by communication client 220 when communications are received. In this embodiment, encrypted communication handler 210 determines whether to decrypt the message and pass the decrypted message on to its intended destination, or to segregate and quarantine the message for failing to pass the authentication process. Encrypted communication handler 210 may provide additional functionality as well.

Application execution environment 200 additionally includes a stored current certificate database 250 to store persistent data, such as the current security certificate. Application execution environment 200 additionally includes a stored archived certificate database 255 to store previously used security certificates. In another embodiment, the functionality of current certificate database 250 and stored archived certificate database 255 is implemented as a single database.

User interface 240 (e.g., a graphical user interface or GUI) is a component for formatting and presenting data to a user. User interface 240 may additionally receive commands and input from the user. In one embodiment, user interface 240 receives a command from a user to replace the current certificate with a replacement certificate, such as a certificate obtained from a Trusted Third Party (TTP). In another embodiment, user interface 240 receives data from communication handler 210, formats the received data, and presents the formatted data to a user indicating that communication handler 210 has determined that the security certificate stored at stored current certificate database 250 is about to expire. In this embodiment, User interface 240 may also receive a command from a user to replace the current certificate with a replacement certificate, such as a certificate obtained from a Trusted Third Party (TTP).

Certificate replacement handler 260 is a component for replacing the current security certificate and ensuring that the replacement security certificate allows encrypted communicating between application execution environment 200 and the message sender. In one embodiment, when User interface 240 sends a command to encrypted communication handler 210 to replace the current security certificate stored at current certificate database 250 with a replacement security certificate (e.g., obtained from a TTP), encrypted communication handler 210 passes the command to certificate replacement handler 260 for execution. Certificate replacement handler 260 obtains the replacement security certificate (e.g., from a TTP) and stores the replacement security certificate at stored replacement certificate database 270.

SSL conversion module 290 is a component for converting an OpenSSL security certificate to a SSL compliant proprietary format that is compatible with a target device, such as a server. The converted replacement security certificate is then available to be sent to the server for implementation. In one embodiment, when the client and the server are using different SSL formats, SSL conversion module 290 converts the security certificate to OpenSSL, allowing the converted security certificate to be sent to the server so that the certificate update occurs without locking out the client or the server. In another embodiment, when the client and the server are using different SSL formats, SSL conversion module 290 converts the security certificate to a proprietary certificate, such as pSkit, allowing the converted security certificate to be sent to the server so that the certificate update occurs without locking out the client or the server.

Verification module 280 is a component layer that performs a verification test to ensure that the replacement security certificate is functioning properly within the system, including at the server as well as at the client device. In one embodiment, verification module 280 is separated from active operating components of application execution environment 200 to avoid any adverse effects should the verification test fail. In another embodiment, a verification test can be accomplished by sending several test messages back and forth between the client and the server utilizing the replacement security certificate. When verification module 280 verifies the replacement certificate is functioning properly, encrypted communication handler 210 is instructed to store the current security certificate at stored archived certificate database 255 and store the replacement certificate at stored current certificate database 250. If, the server and the client device cannot communicate, a roll back can be executed by replacing the replacement security certificate with a previously used certificate to reestablish communication between the client device and the server.

Figure 3:
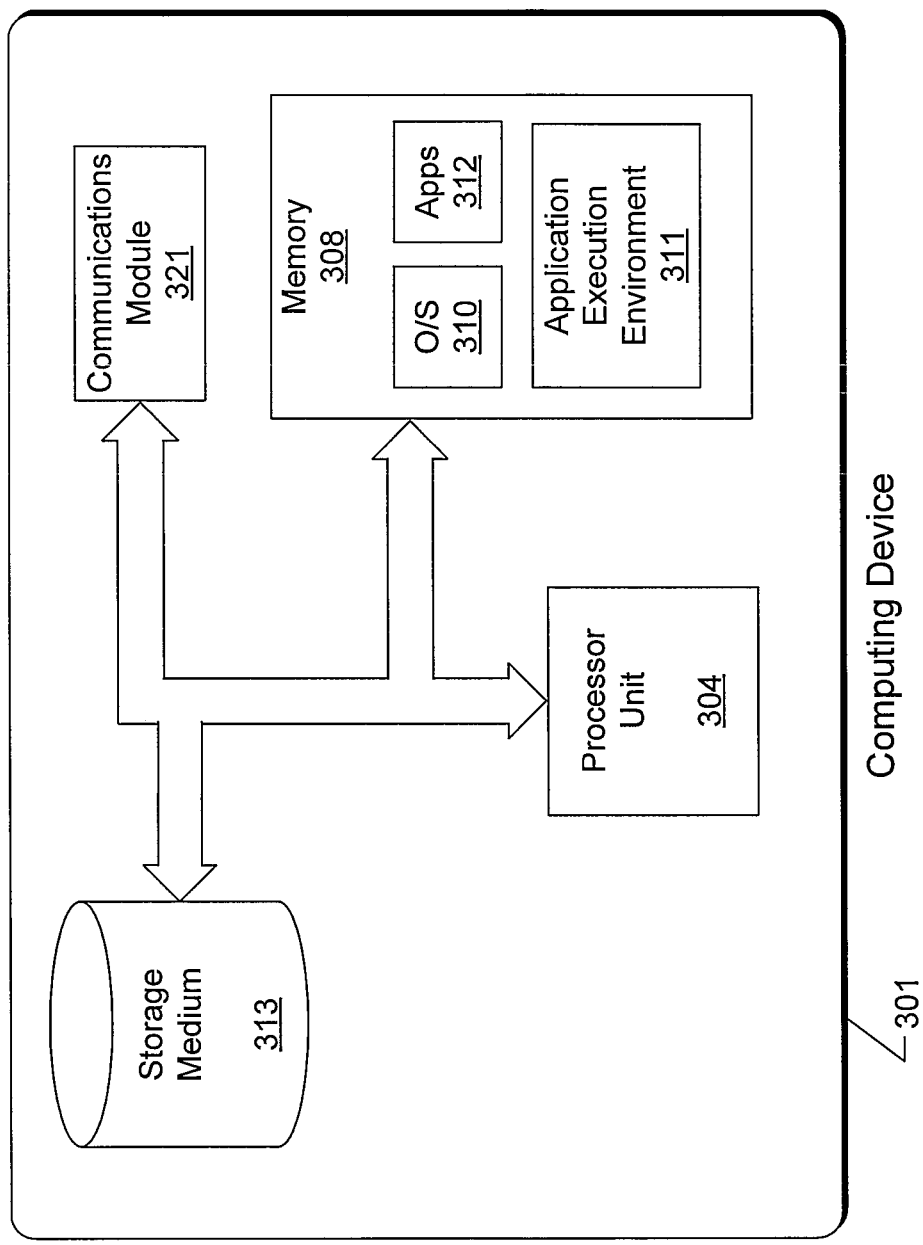
FIG. 3 is a functional block diagram generally illustrating a computing device in which implementations of the invention are applicable.

FIG. 3 is a functional block diagram generally illustrating a sample computing device in which implementations of the invention are applicable. Computing device 301 may be any computing device, such as a server, a personal computer, a laptop computer, or the like. Although described here in the context of a computing device, it should be appreciated that implementations of the invention could have equal applicability to other types of devices.

In this example, computing device 301 includes processor unit 304, memory 308, and storage medium 313. Processor unit 304 advantageously includes a microprocessor or a special-purpose processor such as a digital signal processor (DSP), but may in the alternative be any conventional form of processor, controller, microcontroller, or state machine. Computing device 301 may also include additional components not relevant to the present discussion.

Processor unit 304 is coupled to memory 308, which is advantageously implemented as random access memory (RAM) holding software instructions that are executed by processor unit 304. In this embodiment, the software instructions stored in memory 308 include one or more applications 312, and operating system (O/S) 310. In this particular implementation, computing device 301 further includes an application execution environment 311 that implements the functionality described above in conjunction with FIG. 2. Memory 308 may be on-board RAM, or processor unit 304 and memory 308 could collectively reside in an Application Specific Integrated Circuit (ASIC). In an alternate embodiment, memory 308 may be composed of firmware or flash memory.

Processor unit 304 is also coupled to storage medium 313, which may be implemented as any nonvolatile memory, such as read-only memory (ROM), flash memory, or a magnetic disk drive, just to name a few. Storage medium 313 may also be implemented as any combination of those or other technologies, such as a magnetic disk drive with cache (RAM) memory, or the like. In this particular embodiment, storage medium 313 is used to store data during periods when the computing device 301 may be powered off or is without power.

Computing device 301 also includes communications module 321 that enables communication between computing device 301 and one or more other computing devices. Communications module 321 may include components to enable land line or hard wired network communications, such as an Ethernet connection, universal serial bus connection, IEEE 1394 (Firewire) connection, or the like. Alternatively, communications module 321 may include components to enable RF or other wireless communications, such as a cellular telephone network, Bluetooth connection, wireless local or wide area network. This list of components is intended as a non-exhaustive list and many other alternatives are possible.

Figure 4:
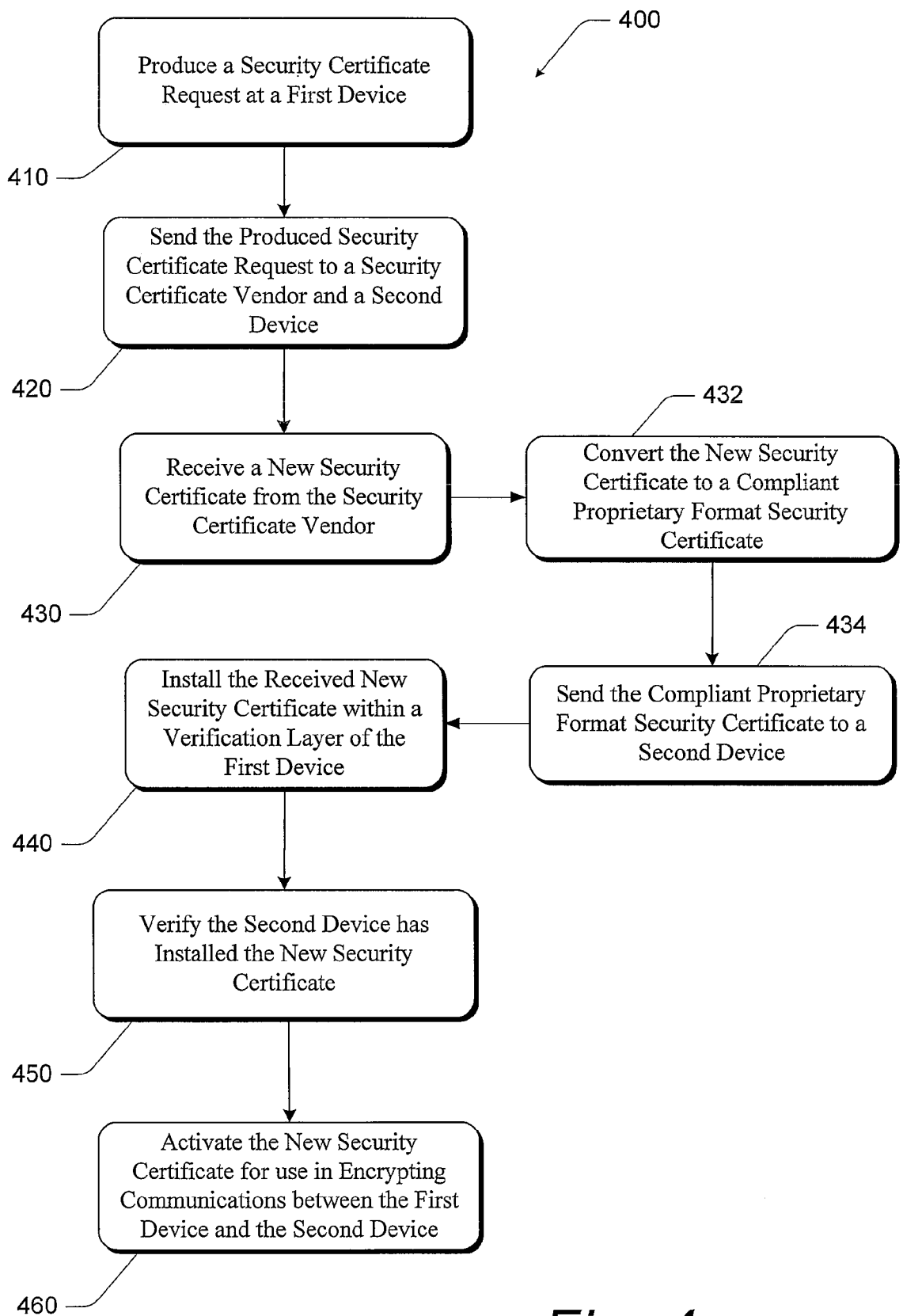
FIG. 4 is an operational flow diagram generally illustrating a process for replacing client and server certificates within a network environment, according to one embodiment of the invention.

FIG. 4 is an operational flow diagram generally illustrating a process for replacing client and server certificates within a network environment. In one embodiment, method 400 is implemented with components, data, and/or the exemplary operating environments of FIGS. 1-3. Although method 400 illustrated in FIG. 4 may be described with reference to components shown in FIGS. 1-3, it should be understood that this is merely for convenience and alternative components can be employed to implement method 400.

Preferably, one or more steps of method 400 are embodied in a computer readable medium containing computer readable code such that a series of steps are performed when the computer readable code is executed on a computing device. In some implementations, certain steps of method 400 are combined, performed simultaneously or in a different order, or perhaps omitted, without deviating from the spirit of method 400.

Method 400 begins at step 410, where a security certificate request is produced at a first device. In one embodiment, the security certificate request is produced responsive to an alarm indicating that the current security certificate is going to expire. In another embodiment, the security certificate request is produced responsive to a user determining that the security certificate should be modified/updated. The security certificate request includes a request for a replacement security certificate that enables encrypted communication between the first device and a second device. In an example and referring to FIG. 1 above, the security certificate request is produced at service console 120 (i.e., the first device) and the replacement security certificate will enable encrypted communication between the service console 120 and server 110 (i.e., the second device) via network 130. In another example, the security certificate request is produced at client 160 and the replacement security certificate will enable encrypted communication between client 160 and server 110 via Internet 140. In one embodiment, instructions/data are received at the first device (e.g., client 160) to replace the security certificate and then the generated request is passed to the second device (e.g., server 110), which returns specific files to the first device. Then, using these files, the first device accesses the security certificate vendor to obtain a new signed certificate. In an example, the instruction is generated at the first device in response to an upcoming expiration of the current security certificate. In another example, the instruction is user desired instruction generated at a user interface in communication with the first device.

At step 420, the produced security certificate request is sent to a security certificate vendor, such as a Trusted Third Party (TTP), and the second device. In one embodiment, the certificate vendor is a TTP Certification Authority.

At step 430, a new security certificate is received from the security certificate vendor. In one embodiment, the received new security certificate is sent from the first device to the second device. In an example, sending the new security certificate from the first device to the second device includes step 432 that converts the new security certificate to a compliant proprietary format security certificate associated with the second device prior to step 434 that sends the compliant proprietary format security certificate to the second device. In another embodiment, the second device separately requests and receives the security certificate from the security certificate vendor.

At step 440, the received new security certificate is installed within a verification layer of the first device. In an example and referring to FIG. 2 above, the received new security certificate is installed within a verification layer within verification module 280 of application execution environment 200 of the first device.

At step 450, the second device is verified to have installed the new security certificate. In one embodiment, the verification verifies the new certificate enables encrypted communication between the first device and the second device.

At step 460, the new security certificate is activated for use in encrypting communications between the first device and the second device. In one embodiment, the current security certificate is archived after the new security certificate is activated. In another embodiment, encrypted messaging capabilities are verified between the first device and the second device, and the archived security certificate is reactivated for use in encrypting communications between the first device and the second device when encrypted messaging capabilities between the first device and the second device using the new security certificate cannot be verified.

Figure 5:
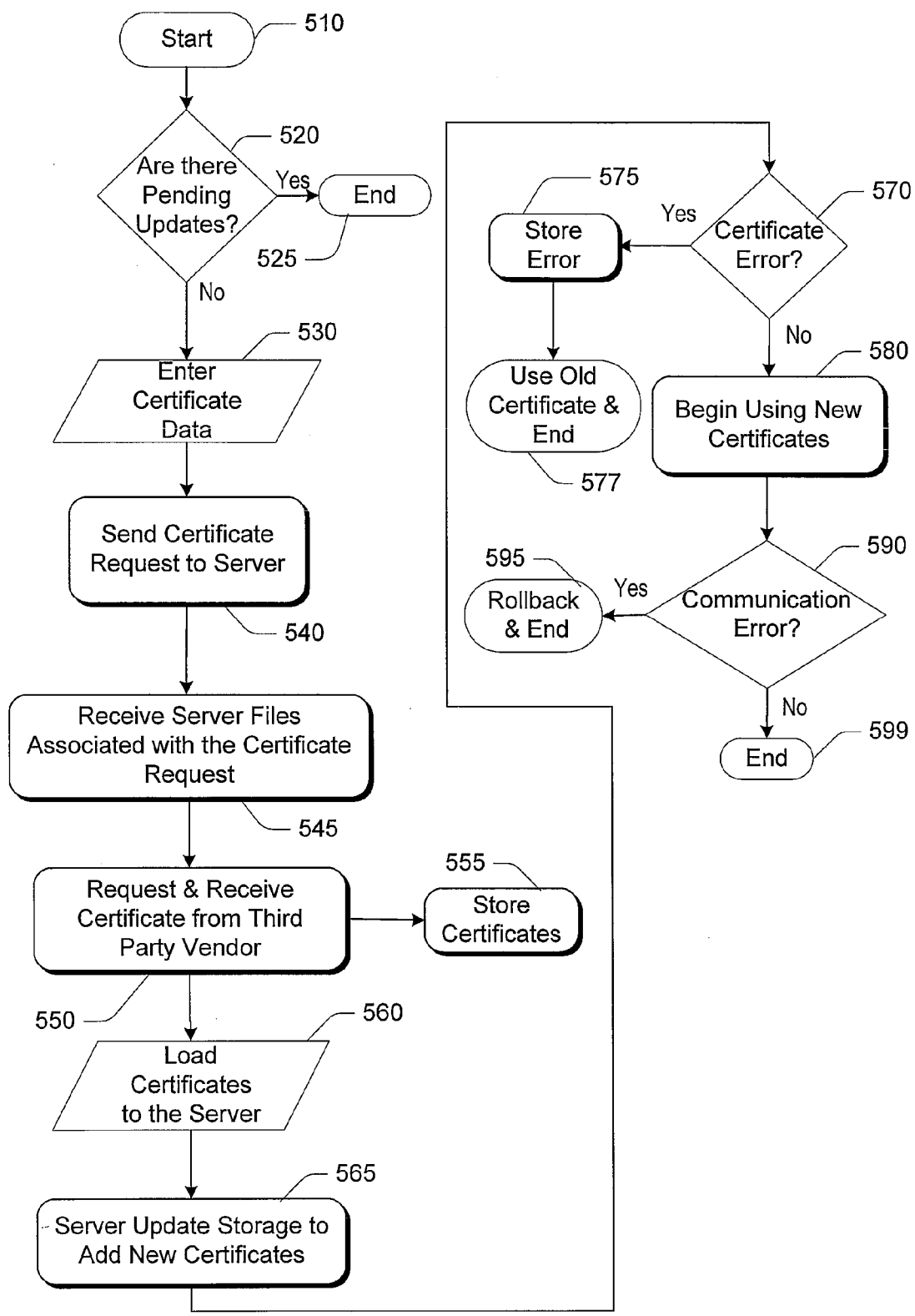
FIG. 5 is an operational flow diagram generally illustrating a process for replacing client and server certificates within a network environment, according to another embodiment of the invention.

FIG. 5 is an operational flow diagram generally illustrating a process for replacing client and server certificates within a network environment. In one embodiment, method 500 is implemented with components, data, and/or the exemplary operating environments of FIGS. 1-3. Although method 500 illustrated in FIG. 5 may be described with reference to components shown in FIGS. 1-3, it should be understood that this is merely for convenience and alternative components can be employed to implement method 500.

As with FIG. 4 above, one or more steps of method 500 are embodied in a computer readable medium containing computer readable code such that a series of steps are performed when the computer readable code is executed on a computing device. In some implementations, certain steps of method 500 are combined, performed simultaneously or in a different order, or perhaps omitted, without deviating from the spirit of method 500.

Method 500 begins at block 510, where a determination is made that a replacement of a certificate is required. In an example and referring to FIG. 1 above, a user using service console 120 determines that a replacement of a certificate is required.

At decision block 520, it is determined whether there are any pending updates. If there are pending updates, method 500 advances to block 525 where method 500 ends. If there are not any pending updates, method 500 advances to input block 530. At input block 530, data necessary to obtain a replacement certificate is obtained from the client and the server. Examples of such data include the server name, client name, organization name, locality, address, and the like.

At block 540, a request to replace the certificate is sent from the client to the server. In one embodiment, the request includes instructions instructing the server to prepare to receive a replacement certificate. In an example and referring to FIG. 1 above, service console 120 sends the certificate replacement request to server 110. At block 545, server files are received from the server associated with the certificate replacement request. In an example and referring to FIG. 1 above, service console 120 receives server files associated with the certificate replacement request from server 110.

At block 550, a replacement certificate is requested and received from a third party vendor. In an example and referring to FIG. 1 above, service console 120 requests and receives a replacement certificate from Trusted Third Party (TTP) 150. At block 555, the received certificate is stored at the console. In an example and referring to FIG. 1 above, the received certificate is stored at service console 120.

At input block 560, the received replacement certificate is sent to and loaded at the server. In an example and referring to FIG. 1 above, service console 120 sends the received replacement certificate to server 110 and server 110 loads the received replacement certificate. At block 565, the server updates its certificate with the replacement certificate.

At decision block 570, a determination is made as to whether there is a certificate error. In one embodiment, a certification error occurs when a certificate cannot be installed correctly, communication between devices utilizing the newly installed certificate cannot occur, and the like. If there is a certificate error, then method 500 advances to block 575 where the error is stored and the certificate is not used. Method 500 then ends. If there is not a certificate error, then method 500 advances to block 580 and the replacement certificate is used. In an example and referring to FIG. 2 above, verification module 280 determines whether there is a certificate error. If there is a certificate error, then method 500 advances to block 577 and the certificate stored at stored current certificate 250 is used. If there is no certificate error, then as indicated in block 580 the certificate stored at stored replacement certificate 270 is used.

At decision block 590, a determination is made whether there is a communication error due to the replacement certificate. If there is a communication error due to the replacement certificate, then method 500 advances to block 595, where the replacement certificate is rolled-back and the previous certificate is used to communicate with the server. Method 500 then ends. In an example and referring to FIG. 2 above, if there is a communication error due to the replacement certificate, then replacement certificate is rolled-back and the previous certificate is retrieved from stored archived certificate 255. If there is not a communication error due to the replacement certificate, then method 500 advances to block 599 where method 500 ends.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method for replacing a current security certificate, comprising:

producing a security certificate request at a first device, the security certificate request including a request for a replacement security certificate to replace a current security certificate, the replacement security certificate enabling encrypted communication between the first device and a second device;

sending the security certificate request to a security certificate vendor;

receiving the replacement security certificate from the security certificate vendor;

installing the replacement security certificate within a verification layer of the first device;

converting the replacement security certificate to a compliant proprietary format associated with the second device;

transmitting the replacement security certificate that has been converted to the compliant proprietary format to the second device;

verifying that the second device has installed the replacement security certificate, the verification further verifying that the replacement security certificate enables encrypted communication between the first device and the second device;

in response to completion of the verification, archiving the current security certificate as a previously used certificate within an archive database, wherein the archive database stores one or more previously used certificates;

activating the replacement security certificate for use in encrypting communications between the first device and the second device;

in response to determining the replacement security certificate has failed, reactivating the previously used certificate and replacing the replacement security certificate with the reactivated previously used certificate;

verifying encrypted messaging capabilities between the first device and the second device using the replacement security certificate; and in response to being unable to verify encrypted messaging capabilities between the first device and the second device using the replacement security certificate, reactivating the archived previously used certificate for use in encrypting communications between the first device and the second device.

2. The method of claim 1, further comprising:

receiving an instruction at the first device to replace the current security certificate;

generating an initial request for information and data from the second device;

transmitting the initial request to the second device;

receiving from the second device the information and data required to generate the security certificate request for the replacement security certificate; and producing the security certificate request utilizing the information and data received from the second device.

3. The method of claim 2, wherein the instruction is automatically generated at the first device in response to an upcoming expiration of the current security certificate.

4. The method of claim 2, wherein the instruction is generated at a user interface in communication with the first device.

5. The method of claim 1, wherein the certificate vendor is a trusted third party security certificate provider.

6. The method of claim 1, further comprising archiving the previously used certificate after the replacement security certificate is activated.

7. A computer program product, comprising:

a non-transitory computer readable storage medium; and program instructions on said non-transitory computer readable storage medium, having a plurality of instructions embodied therein that when processed by a processing device, allow the processing device to perform the functions of:

producing a certificate request at a first device based on received certificate request data, wherein the certificate request is produced to replace a current security certificate;

sending the certificate request to a server;

receiving a certificate response at the first device, wherein the certificate response is sent from the server;

sending the certificate request to a certificate vendor;

receiving, at the first device, a replacement security certificate to replace a current security certificate from the certificate vendor in response to the certificate request;

providing, from the first device, the received replacement security certificate to the server, wherein the providing further comprises:

converting the replacement security certificate to a compliant proprietary format associated with the server; and communicating the replacement security certificate in the compliant proprietary format to the server;

validating the replacement security certificate at the first device and the server, the validation verifying that the replacement security certificate enables encrypted communication between the first device and the server;

in response to completion of the validation, archiving the current security certificate as a previously used certificate within an archive database, wherein the archive database stores one or more previously used certificates;

implementing the replacement security certificate at the first device and the server after the validation is successfully completed;

in response to determining the replacement security certificate has failed, reactivating the previously used certificate and replacing the replacement security certificate with the reactivated previously used certificate;

verifying encrypted messaging capabilities between the first device and the server using the replacement security certificate; and in response to being unable to verify encrypted messaging capabilities between the first device and the server using the replacement security certificate, reactivating the archived previously used certificate for use in encrypting communications between the first device and the server.

8. The computer program product of claim 7, wherein the program instructions for sending the certificate request further comprises:

receiving an instruction at the first device to replace the current security certificate;

generating an initial request for information and data from the server;

transmitting the initial request to the server;

receiving from the server the information and data required to generate the certificate request for the replacement security certificate; and producing the certificate request utilizing the information and data received from the server.

9. The computer program product of claim 8, wherein the instruction is generated at the first device in response to an upcoming expiration of the current security certificate.

10. The computer program product of claim 8, wherein the instruction is generated at a user interface in communication with the first device.

11. The computer program product of claim 7, wherein the certificate vendor is a trusted third party security certificate provider.

12. The computer program product of claim 7, wherein the program instructions further comprise archiving the previously used certificate after the replacement security certificate is activated.

13. A system comprising:

a client comprising a memory device having instructions for receiving encrypted data and for decrypting the received encrypted data using a current security certificate, wherein the instructions further enable the client to perform the steps of:

requesting, via a security certificate request, a new security certificate to replace a current security certificate;

receiving the new security certificate;

installing the received new security certificate;

verifying the installed new security certificate is operating on the client;

replacing the current security certificate with the new security certificate;

archiving the current security certificate as a previously used certificate within an archive database, wherein the archive database stores one or more previously used certificates;

converting the new security certificate to a compliant proprietary format security certificate associated with a server;

sending the new security certificate in the compliant proprietary format to the server;

verifying encrypted messaging capabilities between the client and the server using the new security certificate;

in response to determining the new security certificate has failed, reactivating the previously used certificate and replacing the new security certificate with the reactivated previously used certificate; and in response to being unable to verify encrypted messaging capabilities between the first device and the second device using the replacement security certificate, reactivating the archived previously used security certificate for use in encrypting communications between the client and the server when encrypted messaging capabilities between the client and the server using the new security certificate cannot be verified.

14. The system of claim 13, further comprising a server in communication with the client, the server having instructions executing therein to perform the functions of:
   receiving encrypted data from and providing encrypted data to the client, wherein the server encrypts data using the current security certificate;
   wherein the client further includes instructions for:
      passing a copy of the new security certificate to the server; and
      verifying the installed new security certificate is operating on the server.

15. The system of claim 14, further comprising a certificate vendor in communication with the client, the certificate vendor:
   receiving the request for the new security certificate from the client; and
   in response to receiving the request for the new security certificate from the client, providing the new security certificate to the client;
   wherein the client further includes instructions for:
      requesting the new security certificate from the certificate vendor; and
      receiving the new security certificate from the certificate vendor.

16. The system of claim 14, wherein the client further comprises instructions for:
   receiving an instruction at the client to replace the current security certificate;
   passing the received instruction to the server, the instruction instructing the server to prepare to receive the new security certificate and to provide certificate replacement data to the client, the certificate replacement data describing the server;
   receiving, at the client, the certificate replacement data from the server that describes the server; and
   producing the request for the new security certificate utilizing the certificate replacement data received from the server.

* * * * *